(12) United States Patent
Tang (10) Patent No.: US 11,894,934 B2
(45) Date of Patent: Feb. 6, 2024

(54) METHOD AND DEVICE FOR TRANSMITTING HARQ INFORMATION, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 195 days.

(21) Appl. No.: 16/991,705

(22) Filed: Aug. 12, 2020

(65) Prior Publication Data
US 2020/0374049 A1 Nov. 26, 2020

Related U.S. Application Data

(63) Continuation of application No. PCT/CN2018/076667, filed on Feb. 13, 2018.

(51) Int. Cl.
*H04W 72/04* (2023.01)
*H04L 1/18* (2023.01)
(Continued)

(52) U.S. Cl.
CPC ....... *H04L 1/1893* (2013.01); *H04W 72/0446* (2013.01); *H04L 1/1812* (2013.01)

(58) Field of Classification Search
CPC ... H04L 1/1893; H04L 5/0055; H04L 1/1854; H04L 1/1812; H04L 1/1848; H04L 1/1896; H04W 72/0446
See application file for complete search history.

(56) References Cited

U.S. PATENT DOCUMENTS

2018/0042015 A1 2/2018 Yin et al.
2018/0175973 A1 6/2018 Rosa et al.
(Continued)

FOREIGN PATENT DOCUMENTS

| CN | 107332646 A | 11/2017 |
| CN | 107566097 A | 1/2018 |
| WO | 2016198734 A1 | 12/2016 |

OTHER PUBLICATIONS

Written Opinion of the International Search Authority in the international application No. PCT/CN2018/076667, dated Oct. 31, 2018.
(Continued)

*Primary Examiner* — Jae Y Lee
*Assistant Examiner* — Aixa A Guadalupe Cruz
(74) *Attorney, Agent, or Firm* — PERKINS COIE LLP (57) ABSTRACT

Disclosed are a method and device for transmitting HARQ information, and a computer storage medium. The method comprises: a terminal device determines a first uplink time unit, the first uplink time unit being a time unit for use by the terminal device in transmitting first uplink control information, the first uplink control information comprising first HARQ information, the first HARD information being at least one piece of HARQ information corresponding to a first downlink shared channel received by the terminal device, the first downlink shared channel comprising at least one downlink shared channel, and the first downlink shared channel being transmitted in at least one downlink time unit in a first time period; and the terminal device transmits the first uplink control information in the first uplink time unit.

12 Claims, 5 Drawing Sheets

(51) Int. Cl.
*H04L 1/1867* (2023.01)
*H04W 72/0446* (2023.01)
*H04L 1/1812* (2023.01)

(56) References Cited

U.S. PATENT DOCUMENTS

2018/0278373 A1* 9/2018 Wang .................... H04L 5/0055
2018/0375623 A1* 12/2018 Suzuki ................... H04W 72/04
2020/0337072 A1* 10/2020 Lunttila ................. H04L 5/0055

OTHER PUBLICATIONS

Huawei, HiSilicon, "NR frame structure on unlicensed bands", 3GPP TSG RAN WG1 Adhoc Meeting, R1-1800040, Jan. 22-26, 2018.
International Search Report in the international application No. PCT/CN2018/076667, dated Oct. 31, 2018.
Huawei et al. "UCI Transmission for eLAA" 3GPP TSG RAN WG1 Meeting #85 R1-164076, May 27, 2016 (May 27, 2016), sections 4.1.
LG Electronics. "PUCCH Design in LAA" 3GPP TSG RAN WG1 Meeting #84bis R1-162469, Apr. 15, 2016 (Apr. 15, 2016), entire document.
Oppo: "HARQ-ACK transmission on eLAA carrier" 3GPP Draft; R1-162319, 3rd Generation Partnership Project (3GPP), Mobile Competence Centre; 650, Route Des Lucioles; F-06921 Sophia-Antipolis Cedex; France, vol. RAN WG1, No. Busan, Korea; Apr. 11, 2016-Apr. 15, 2016, Apr. 1, 2016 (Apr. 1, 2016), XP051079537 Retrieved from the Internet: URL: http://www.3gpp. org/ftp/tsg ran/WG1 RL/TSGR1 84b/Docs/[ retrieved on Apr. 1, 2016]*section 2 *.
Oppo: "HARQ operation in NR", 3GPP Draft; R2-1702544 HARQ Operation in NR, 3rd Generation Partnership Project(3GPP), Mobile Competence Centre; 650, Route Des Lucioles; F-06921 Sophia Anti Polis Cedex; France, vol. RAN WG2, No. Spokane, USA; Apr. 3, 2017-Apr. 7, 2017, Apr. 3, 2017 (Apr. 3, 2017), XP051244560, Retrieved from the Internet: URL: http://www.3gpp. org/ftp/ Meetings 3GPP SYNC/RAN2/Docs/[ retrieved on Apr. 3, 2017]*section 2 *.
Supplementary European Search Report in the European application No. 18906567.5, dated Feb. 17, 2021.

* cited by examiner

FIG. 1

```
A terminal device determines first uplink time unit, the first uplink time unit is
used for the terminal device to transmit first uplink control information, the first
  uplink control information includes first HARQ information, the first HARQ          201
information includes at least one piece of HARQ information corresponding to a
first downlink shared channel received by the terminal device, the first downlink
     shared channel includes at least one downlink shared channel and the first
downlink shared channel is transmitted through at least one downlink time cell
                             in a first time duration
```

202
```
    The terminal device transmits the first uplink control information in the first
                                    uplink time unit
```

METHOD AND DEVICE FOR TRANSMITTING HARQ INFORMATION, AND COMPUTER STORAGE MEDIUM

CROSS-REFERENCE TO RELATED APPLICATION

The present application is a continuation of International Application No. PCT/CN2018/076667 filed on Feb. 13, 2018, the disclosure of which is hereby incorporated by reference in its entirety.

TECHNICAL FIELD

The disclosure relates to the technical field of wireless communication, and particularly to a method and device for transmitting Hybrid Automatic Repeat reQuest (HARQ) information and a computer storage medium.

BACKGROUND

Along with the development of wireless communication technologies, a Licensed-Assisted Access (LAA)-Long Term Evolution (LTE) system based on the LTE system provides service for a terminal device based on a Carrier Aggregation (CA) structure by taking a carrier in a licensed spectrum as a primary carrier and taking a carrier in an unlicensed spectrum as a secondary carrier. When a New Radio (NR) system is applied to an unlicensed spectrum, not only is LAA networking supported, but also Standalone (SA) networking is supported, so that it is necessary to consider transmission of a Physical Uplink Control Channel (PUCCH) via the unlicensed spectrum.

An NR system includes multiple PUCCH formats, and a PUCCH in each format occupies multiple symbol lengths, as shown in Table 1.

TABLE 1

| PUCCH format | The number of Symbols occupied by PUCCH | The number of Bits carried on PUCCH |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

A network device may configure one or more of the PUCCH formats 0, 1, 2, 3 and 4 for a terminal device. Configuration information of a PUCCH resource at least includes a position of a starting symbol for the PUCCH and a symbol number occupied by the PUCCH. Specifically, for the PUCCH format 0 or 2, the symbol number corresponding to the PUCCH is 1 or 2; and for the PUCCH format 1, 3 or 4, the symbol number corresponding to the PUCCH is any number from 4 to 14.

Figure 1:
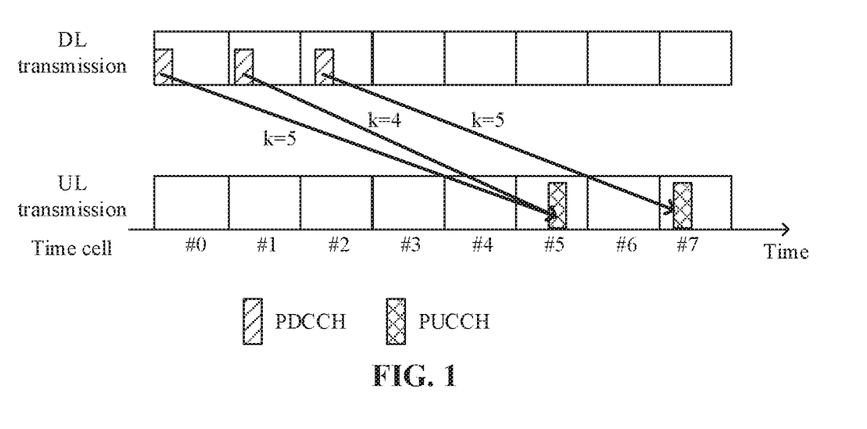
FIG. 1 is a time-domain diagram of PDSCH-HARQ feedback.

A network device dynamically indicates a time-domain position of a PUCCH resource for a terminal device through Downlink Control Information (DCI). For example, the network device determines the time-domain position of the PUCCH resource through Physical Downlink Shared Channel (PDSCH)-HARQ indication information (PDSCH-HARQ feedback time indication information) in the DCI. As shown in FIG. 1, it is to be understood that the DCI is carried on a Physical Downlink Control Channel (PDCCH) shown in FIG. 1. For example, the network device schedules transmission of a PDSCH in a time unit #0 through a PDCCH, and the PDCCH indicates k=5 in feedback time n+k of an uplink feedback PDSCH-HARQ corresponding to the PDSCH. In FIG. 1, there is made such a hypothesis that the PDCCH and the PDSCH are in the same time unit. The terminal device, after receiving the PDSCH in an nth time unit, feeds back HARQ information corresponding to the PDSCH in an (n+5)th time unit, namely a PUCCH is transmitted in a time unit #5 in FIG. 1, the PUCCH carries the HARQ information corresponding to the PDSCH in the time unit #0.

A terminal device, before transmitting a signal, is required to detect a channel in an unlicensed spectrum by Clear Channel Assessment (CCA). The terminal device may transmit a PUCCH when the channel is idle, otherwise may not transmit the PUCCH. Using fixed PDSCH-HARQ feedback time may scatter PUCCH resources determined according to the PDSCH-HARQ feedback time, thereby influencing uplink scheduling of a network device.

SUMMARY

For solving the technical problem, embodiments of the disclosure provide a method and device for transmitting HARQ information and a computer storage medium.

A first aspect provides a method for transmitting HARQ information, which may include the following operations.

A terminal device determines a first uplink time unit, the first uplink time unit is used for the terminal device to send first uplink control information, the first uplink control information includes first HARQ information, the first HARQ information includes at least one piece of HARQ information corresponding to a first downlink shared channel received by the terminal device, and the first downlink shared channel includes at least one downlink shared channel.

The terminal device transmits the first uplink control information in the first uplink time unit.

A second aspect provides a device for transmitting Hybrid Automatic Repeat reQuest (HARQ) information. The device includes a processor; a memory for storing instructions executable by the processor; and an input/output interface, herein the processor is configured to execute the instructions to perform the following operations: determining a first uplink time unit, the first uplink time unit is a time unit configured to transmit first uplink control information, the first uplink control information comprises first HARQ information, the first HARQ information includes at least one piece of HARQ information corresponding to a first downlink shared channel, the first downlink shared channel comprises at least one downlink shared channel, and the first downlink shared channel is transmitted through at least one downlink time unit in a first time duration; and transmitting the first uplink control information in the first uplink time unit via the input/output interface.

A third aspect provides a computer storage medium, which is configured to store a computer software instruction for executing the method in the first aspect, including a program designed to execute the abovementioned aspect.

BRIEF DESCRIPTION OF THE DRAWINGS

The drawings described herein are adopted to provide a further understanding to the disclosure and form a part of the disclosure. Schematic embodiments of the disclosure and descriptions thereof are adopted to explain the disclosure and not intended to form improper limits to the disclosure. In the drawings.

DETAILED DESCRIPTION

For making the technical solutions of the embodiments of the disclosure convenient to understand, related technologies involved in the embodiments of the disclosure will be described below.

1) Unlicensed Spectrum

Unlicensed spectrums are spectrums divided by countries and districts and available for radio device communication, and the spectrums are usually considered as shared spectrums, namely communication devices in different communication systems may use the spectrums without applying to the governments for dedicated spectrum grants when meeting regulatory requirements set by the countries or the districts for the spectrums. For ensuring friendly coexistence of each communication system using unlicensed spectrums for wireless communication in the spectrums, some countries or districts set regulatory requirements for use of the unlicensed spectrums. For example, in the Europe, a communication device follows a Listen Before Talk (LBT) principle, namely the communication device, before transmitting a signal in a channel of an unlicensed spectrum, is required to sense the channel at first, the communication device may transmit the signal only when a channel sensing result is that the channel is idle, and if the channel sensing result of the communication device for the channel of the unlicensed spectrum is that the channel is busy, the communication device may not transmit the signal. For ensuring fairness, during a transmission, a time length for signal transmission of the communication device using the channel of the unlicensed spectrum may not exceed Maximum Channel Occupation Time (MCOT). For another example, for avoiding sub-band interference to a signal transmitted in a channel of an unlicensed spectrum and improving detection accuracy of a communication device in detecting the channel of the unlicensed spectrum, the signal transmitted in the channel of the unlicensed spectrum is required to at least occupy a certain proportion of a bandwidth of the channel. For example, for a 5 GHz band, a signal occupies 80% of a bandwidth of a channel, and for a 60 GHz band, a signal occupies 70% of a bandwidth of a channel. For another example, for avoiding influence of a signal transmitted in a channel of an unlicensed spectrum with excessively high power on transmission of another important signal such as a radar signal in the channel, a maximum power spectral density for signal transmission of a communication device using a channel of an unlicensed spectrum is specified in regulations.

2) Network Architecture

The embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Universal Mobile Telecommunication System (UMTS), an LTE system as well as an evolved system of the LTE system such as an Advanced LTE (LTE-A) system, an NR system as well as an evolved system of the NR system such as an NR-based access to Unlicensed spectrum (NR-U) system, or a next-generation communication system.

Generally speaking, connections supported by a conventional communication system are usually limited in number and also easy to implement. However, along with the development of communication technologies, a mobile communication system will not only support conventional communication but also support, for example, Device to Device (D2D) communication, Machine to Machine (M2M) communication, Machine Type Communication (MTC) and Vehicle to Vehicle (V2V) communication.

A communication system in the embodiments of the disclosure may be applied to a CA scenario, may also be applied to a Dual Connectivity (DC) scenario and may further be applied to an SA networking scenario.

Each embodiment of the disclosure is described in combination with a network device and a terminal device.

The terminal device may also be called User Equipment (UE), an access terminal, a user unit, a user Station (ST), a mobile radio ST, a mobile ST, a remote ST, a remote terminal, a mobile device, a user terminal, a terminal, a wireless communication device, a user agent or a user device. The terminal device may be an ST in a Wireless Local Area Network (WLAN), and may be a cell phone, a cordless phone, a Session Initiation Protocol (SIP) phone, a Wireless Local Loop (WLL) ST, a Personal Digital Assistant (PDA), a handheld device with a wireless communication function, a computing device, another processing device connected to a wireless modem, a vehicle device, a wearable device, a terminal device in a next-generation communication system, for example, a future fifth-Generation (5G) network, a terminal device in a future evolved Public Land Mobile Network (PLMN) or the like.

Exemplarily but unlimitedly, in the embodiments of the disclosure, the terminal device may also be a wearable device. The wearable device may also be called a wearable intelligent device and is a generic term of wearable devices obtained by performing intelligentization designing and development on daily wearing products, for example, glasses, gloves, watches, clothes and shoes. The wearable device is a portable device directly worn or integrated to clothes or accessory of a user. The wearable device not only is a hardware device but also realizes powerful functions through software support, data interaction and cloud interaction. Generalized wearable intelligent device includes, for example, intelligent watches or intelligent glasses with complete functions and large sizes and capable of realizing all or part of functions independently of intelligent phones, and for example, various types of intelligent bands and intelligent jewelries of which each is dedicated to application functions of a certain type and required to be matched with other devices such as intelligent phones for use.

The network device may be a device configured to communicate with a mobile device, and the network device may be an Access Point (AP) in the WLAN, a Base Transceiver Station (BTS) in the GSM or CDMA, may also be a NodeB (NB) in WCDMA, and may further be an Evolutional Node B (eNB or eNodeB) in LTE, or a relay station or AP, or a vehicle device, a wearable device, a network device in an NR network, a network device in the future evolved PLMN or the like.

In the embodiments of the disclosure, the network device provides service for a cell, and the terminal device communicates with the network device through a transmission resource (for example, a frequency-domain resource or a spectrum resource) for the cell. The cell may be a cell corresponding to the network device (for example, a base station), and the cell may belong to a macro base station and may also be a base station corresponding to a small cell. Here, the small cell may include: a metro cell, a micro cell, a pico cell, a femto cell and the like. These small cells have the characteristics of small coverage and low transmitted power and are applied to provision of high-rate data transmission service.

In the embodiments of the disclosure, multiple cells may simultaneously work on the same frequency in a carrier in an LTE system or an NR system, and in some special scenarios, concepts of carrier and cell may also be considered to be equivalent. For example, in a CA scenario, when a secondary carrier is configured for UE, both a carrier index of the secondary carrier and a cell Identity (ID) of a secondary cell working in the secondary carrier may be contained, and under this condition, the concepts of carrier and cell may be considered to be equivalent. For example, for the UE, access to a carrier and access to a cell are equivalent.

It is to be noted that a PUCCH in the embodiments of the disclosure may be a PUCCH in an LTE system, may also be a PUCCH in an NR system and may also be an uplink control channel in another system. There are no limits made thereto in the disclosure.

In the embodiments of the disclosure, uplink control information may include at least one of HARQ information, Channel-State Information (CSI), Schedule Request (SR) information and other control information transmitted by UE. The CSI includes at least one of Rank Indicator (RI) information, Precoding Matrix Indicator (PMI) information and Channel Quality Indicator (CQI) information.

In the embodiments of the disclosure, the uplink control information may be transmitted through the PUCCH and may also be transmitted through a Physical Uplink Shared Channel (PUSCH). There are no limits made thereto in the disclosure.

Optionally, in the embodiments of the disclosure, a downlink transmission opportunity may be defined as one or more continuous time units configured to transmit downlink information, and similarly, an uplink transmission opportunity may be defined as one or more continuous time units configured to transmit uplink information.

In the embodiments of the disclosure, a time unit may be defined as one or more subframes, may also be defined as one or more slots and may also be defined as one or more mini-slots or symbols, etc. A starting time unit and/or last time unit of a downlink transmission opportunity or an uplink transmission opportunity may be a complete time unit and may also be part of a time unit, etc. There are no limits made thereto in the embodiment of the disclosure.

Optionally, a time unit in the disclosure may refer to a complete time unit and may also refer to an incomplete time unit. For example, an uplink time unit may refer to that all symbols in the time unit are configured for uplink transmission and may also refer to that part of the symbols in the time unit are configured for uplink transmission. There are no limits made thereto in the disclosure.

According to the technical solutions of the embodiments of the disclosure, flexible PDSCH-HARQ feedback time (or called a time sequence) is introduced into an NR-U system, thereby ensuring a delay and performance of the whole communication link.

Figure 2:
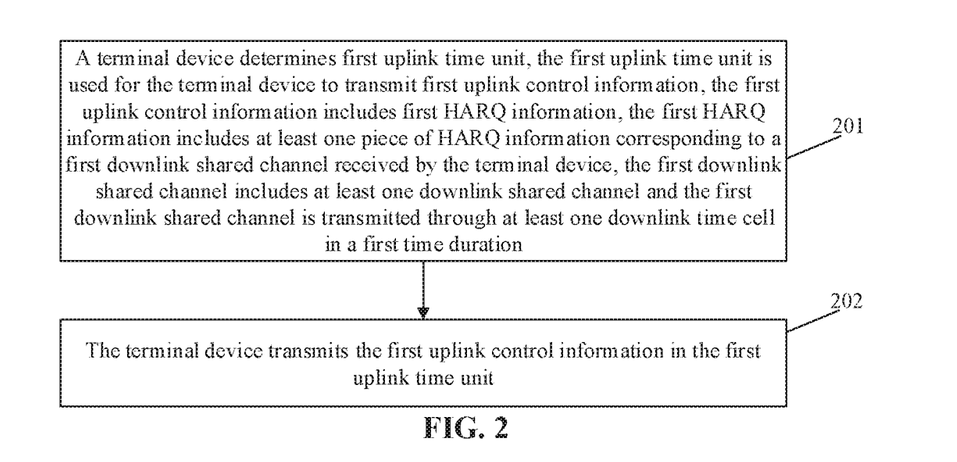
FIG. 2 is a first flowchart of a method for transmitting HARQ information according to an embodiment of the disclosure.

FIG. 2 is a first flowchart of a method for transmitting HARQ information according to an embodiment of the disclosure. As shown in FIG. 2, the method for transmitting HARQ information in the embodiment of the disclosure includes the following steps.

In 201, a terminal device determines a first uplink time unit, the first uplink time unit is used for the terminal device to transmit first uplink control information, the first uplink control information includes first HARQ information, the first HARQ information includes at least one piece of HARQ information corresponding to a first downlink shared channel received by the terminal device and the first downlink shared channel includes at least one downlink shared channel.

Optionally, the first downlink shared channel is transmitted through at least one downlink time unit in a first time duration.

In the embodiment of the application, the first uplink control information includes the at least one piece of HARQ information corresponding to the at least one downlink shared channel demodulated in the first time duration (i.e., one or more fixed time units). Herein, the first time duration includes the downlink time unit, but whether the first time duration includes an uplink time unit or not is not limited, namely the first time duration may include the uplink time unit and may also not include the uplink time unit.

For example, the first time duration includes M downlink time units, the M downlink time units are configured to transmit the first downlink shared channel, for example, N downlink shared channels (optionally, N is a positive integer less than or equal to M), and the first uplink control information transmitted by the terminal device in the first uplink time unit includes HARQ information corresponding to the N downlink shared channels.

Optionally, the terminal device receives first information transmitted by a network device, the first information indicates a time-domain position of the first uplink time unit.

In 202, the terminal device transmits the first uplink control information in the first uplink time unit.

In the embodiment of the application, a position relationship between the first time duration and the first uplink time unit may be determined in at least one of the following manners.

1) A last downlink time unit in the first time duration is a first downlink time unit, and a time interval between the first downlink time unit and the first uplink time unit is more than or equal to a first value.

Optionally, the first value is specified by a communication system; or, the first value is indicated by the network device through physical-layer signaling; or, the first value is configured by the network device through higher-layer signaling.

Optionally, the first value is determined according to a HARQ processing capability of the terminal device.

Optionally, the first value is determined according to a priority of a service transmitted in the first downlink shared channel.

2) A starting downlink time unit in the first time duration is a second downlink time unit, and a time interval between the second downlink time unit and the first uplink time unit is less than or equal to a second value.

Optionally, the second value is specified by the communication system; or,
the second value is indicated by the network device through the physical-layer signaling; or,
the second value is configured by the network device through the higher-layer signaling.

Optionally, the second value is greater than the first value.

In the embodiment of the application, a unit of the time interval may be time unit, and a unit of the value may also be time unit. For example, for definition of the time interval, a time interval between a time unit #2 and a time unit #3 is a time unit, and a time interval between a time unit #5 and a time unit #8 is three time units. For example, for definition of the value, if the first value is three time units, the second value is five time units and the time unit configured to transmit the first uplink control information is the time unit #8, HARQ information corresponding to downlink shared channels transmitted in the time unit #3, a time unit #4 and the time unit 35 is fed back in the time unit #8.

In an implementation mode, the terminal device transmits the first uplink control information in a second uplink time unit, the second uplink time unit is later than the first uplink time unit.

Herein, the first uplink control information may be repeatedly transmitted in multiple uplink time units. If the transmission of the first uplink control information in the first uplink time unit fails, the first uplink control information is repeatedly transmitted in the second uplink time unit after the first uplink time unit, to increase a transmitting probability of the first uplink control information.

Optionally, the terminal device determines a time-domain position of the second uplink time unit according to indication information received from the network device. For example, the first information also indicates the time-domain position of the second uplink time unit.

In the embodiment of the application, the first uplink control information includes the at least one piece of HARQ information for the at least one downlink shared channel in the first time duration (i.e., a fixed time unit), and similarly, the second uplink control information may include at least one piece of HARQ information for at least one downlink shared channel in a second time duration.

In such case, the terminal device determines a third uplink time unit, the third uplink time unit is used for the terminal device to transmit the second uplink control information, the second uplink control information includes second HARQ information, the second HARQ information is the at least one piece of HARQ information corresponding to a second downlink shared channel received by the terminal device, the second downlink shared channel includes at least one downlink shared channel and the second downlink shared channel is transmitted on at least one downlink time unit in the second time duration; and the terminal device transmits the second uplink control information in the third uplink time unit.

Optionally, the terminal device receives second information transmitted by the network device, the second information indicates a time-domain position of the third uplink time unit.

Optionally, the second time duration is later than the first time duration, and there is no downlink time unit between the first time duration and the second time duration.

Optionally, the second time duration is later than the first time duration, and the first time duration and the second time duration include the same third downlink time unit, the third downlink time unit includes at least one downlink time unit. Furthermore, the first uplink control information further includes third HARQ information, and/or, the second uplink control information further includes the third HARQ information, the third HARQ information includes at least one piece of HARQ information corresponding to at least one downlink shared channel transmitted in the third downlink time unit. That is, the third HARQ information is transmitted in the first uplink time unit, or, the third HARQ information is transmitted in the third uplink time unit, or, the third HARA information may be transmitted in the first uplink time unit and the third uplink time unit.

Figure 4:
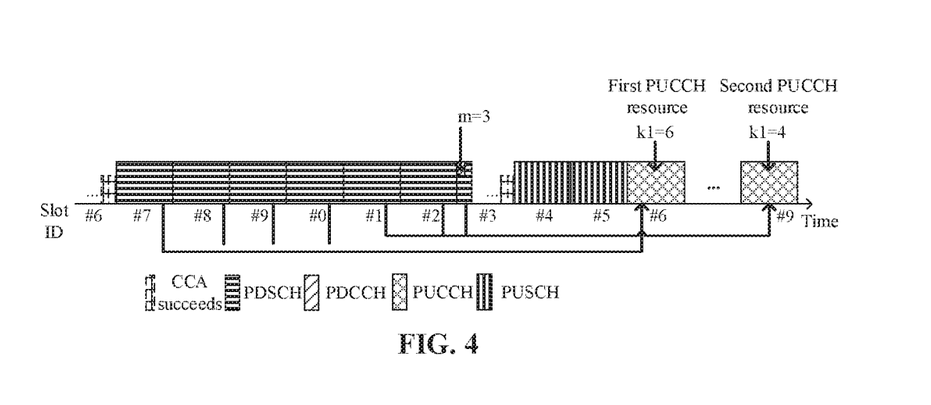
FIG. 4 is a time-domain diagram of PDSCH-HARQ feedback according to an embodiment of the disclosure.

FIG. 4 is a time-domain diagram of PDSCH-HARQ feedback according to an embodiment of the disclosure. Referring to FIG. 4, time units are cyclically numbered to be #0 to #9, and a downlink transmission in an unlicensed spectrum includes seven time units. A time unit where a PDSCH is located includes the time unit #7, the time unit #8, the time unit #9, the time unit #0, the time unit #1, the time unit #2, part of the time unit #3. In addition, a starting PUCCH (i.e., first PUCCH) resource is in the time unit #6, and a next PUCCH (i.e., third PUCCH) resource is after the starting PUCCH resource. In the embodiment of the application, a HARQ that should be fed back in the time unit may be determined according to the time unit where the PUCCH is located. For example, there is a PUCCH resource in a time unit n1 (i.e., a first uplink time unit), and the PUCCH resource is configured to transmit HARQs to be fed back corresponding to a PDSCH in time units before a time unit n1−k1 (including the time unit n1−k1) and/or after a time unit n1−k2 (including the time unit n1−k2), n1 represents a time unit where the PUCCH is located, k1 is a first value and k2 is a second value.

Optionally, a network device schedules transmission of a PUCCH in a downlink time unit (for example, the time unit #3 in FIG. 4) through a PDCCH, the PDCCH indicates that a time unit corresponding to n2+m is a time-domain position of the PUCCH, n2 representing a time unit where the PDCCH is located and m being a third value.

Optionally, for one UE, a downlink transmission time unit corresponding to a PUCCH resource is fixed, namely HARQ information size transmitted in a PUCCH resource is fixed.

FIG. 4 schematically shows that HARQ information corresponding to a PDSCH demodulated in a first time duration should be fed back in the first PUCCH resource. As shown in FIG. 4, for the first PUCCH resource in the time unit #6 (i.e., the first uplink time unit), k1=6, and k2=9. The first time duration includes the time units #7, #8, #9 and #0. Correspondingly, HARQ information corresponding to the PDSCH transmitted in the time units #7, #8, #9 and #0 may be transmitted to the network device through the first PUCCH resource, namely the HARQ information size (i.e., first uplink control information) transmitted in the first PUCCH resource is fixed.

Optionally, if the UE fails in transmission on the first PUCCH resource, for example, the UE fails in channel detection before the first PUCCH resource, the UE may transmit the HARQ information in the third PUCCH resource. The third PUCCH resource is a PUCCH resource after the first PUCCH resource, and a PUCCH format corresponding to the third PUCCH resource may be the same as or different from a format corresponding to the first PUCCH resource.

FIG. 4 also schematically shows that HARQ information corresponding to a PDSCH demodulated in a second time duration should be fed back in the first PUCCH resource. As shown in FIG. 4, for a second PUCCH resource in the time unit #9 (i.e., a third uplink time unit), k1=4, and k2=8. The second time duration includes the time units #1, #2, #3, #4 and #5, the time units #4 and #5 are uplink time units. Correspondingly, HARQ information corresponding to the PDSCH transmitted in the time units #1, #2 and #3 may be transmitted to the network device through the second PUCCH resource, namely the HARQ information size (i.e., second uplink control information) transmitted in the second PUCCH resource is also fixed.

Optionally, if the UE fails in transmission on the second PUCCH resource, for example, the UE fails in channel detection before the second PUCCH resource, the UE may transmit the information in a fourth PUCCH resource. The fourth PUCCH resource is a PUCCH resource after the second PUCCH resource, and a PUCCH format corresponding to the fourth PUCCH resource may be the same as or different from a format corresponding to the second PUCCH resource.

With adoption of the technical solution of the embodiment of the disclosure, when uplink control information is fed back in an unlicensed carrier, one or more downlink time units corresponding to a PUCCH are determined based on a time unit where the PUCCH is located, thereby feeding back, in the PUCCH, HARQ information corresponding to a PDSCH transmitted in the one or more downlink time units. By such a flexible HARQ feedback method, the network device may flexibly and effectively allocate uplink and downlink resources in an unlicensed spectrum under the condition of ensuring a delay and performance of the whole communication link.

Figure 3:
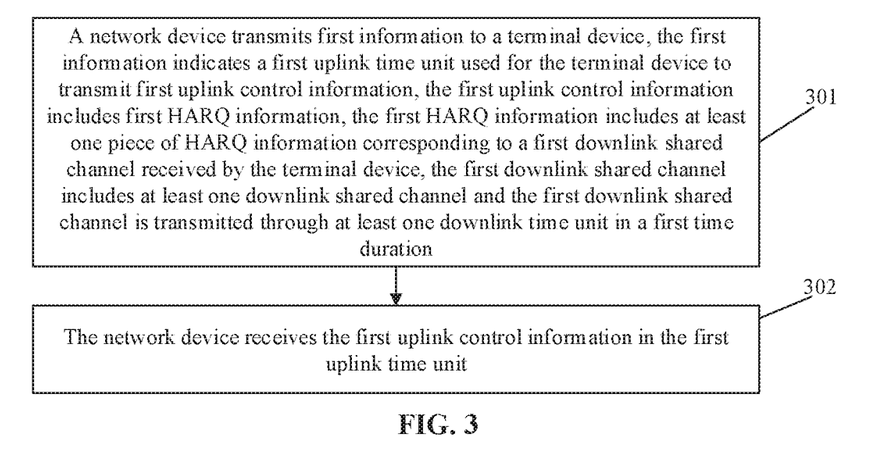
FIG. 3 is a second flowchart of a method for transmitting a HARQ information according to an embodiment of the disclosure.

FIG. 3 is a second flowchart of a method for transmitting HARQ information according to an embodiment of the disclosure. As shown in FIG. 3, the method for transmitting the HARQ information in the embodiment of the disclosure includes the following steps.

In 301, a network device transmits first information to a terminal device, the first information indicates a first uplink time unit used for the terminal device to transmit first uplink control information, the first uplink control information includes first HARQ information, the first HARQ information includes at least one piece of HARQ information corresponding to a first downlink shared channel received by the terminal device and the first downlink shared channel includes at least one downlink shared channel.

In 302, the network device receives the first uplink control information in the first uplink time unit.

Optionally, the first downlink shared channel is transmitted through at least one downlink time unit in a first time duration.

In an implementation mode, a last downlink time unit in the first time duration is a first downlink time unit, and a time interval between the first downlink time unit and the first uplink time unit is more than or equal to a first value.

In an implementation mode, the first value is specified by a communication system; or,
the first value is indicated by the network device through physical-layer signaling; or,
the first value is configured by the network device through higher-layer signaling.

In an implementation mode, a starting downlink time unit in the first time duration is a second downlink time unit, and a time interval between the second downlink time unit and the first uplink time unit is less than or equal to a second value.

In an implementation mode, the second value is specified by the communication system; or,
the second value is indicated by the network device through the physical-layer signaling; or,
the second value is configured by the network device through the higher-layer signaling.

In an implementation mode, the method further includes the following operation.

The network device receives the first uplink control information in a second uplink time unit, the second uplink time unit is later than the first uplink time unit.

In an implementation mode, the method further includes the following operations.

The network device transmits second information to the terminal device, the second information indicates a third uplink time unit used for the terminal device to transmit second uplink control information, the second uplink control information includes second HARQ information, the second HARQ information includes at least one piece of HARQ information corresponding to a second downlink shared channel received by the terminal device, the second downlink shared channel includes at least one downlink shared channel, and the second downlink shared channel is transmitted in at least one downlink time unit in a second time duration.

The network device receives the second uplink control information in the third uplink time unit.

In an implementation mode, the second time duration is later than the first time duration, and there is no downlink time unit between the first time duration and the second time duration.

In an implementation mode, the second time duration is later than the first time duration, and each of the first time duration and the second time duration includes the same third downlink time unit, the third downlink time unit includes at least one downlink time unit.

In an implementation mode, the first uplink control information further includes third HARQ information, and/or, the second uplink control information further includes the third HARQ information, the third HARQ information being at least one piece of HARQ information corresponding to at least one downlink shared channel transmitted in the third downlink time unit.

Those skilled in the art should know that the embodiment of the disclosure for a network device side may be understood with reference to the embodiment for a terminal device side and an information feedback method for the network device side and an information feedback method for the terminal device have corresponding flows and effects.

Figure 5:
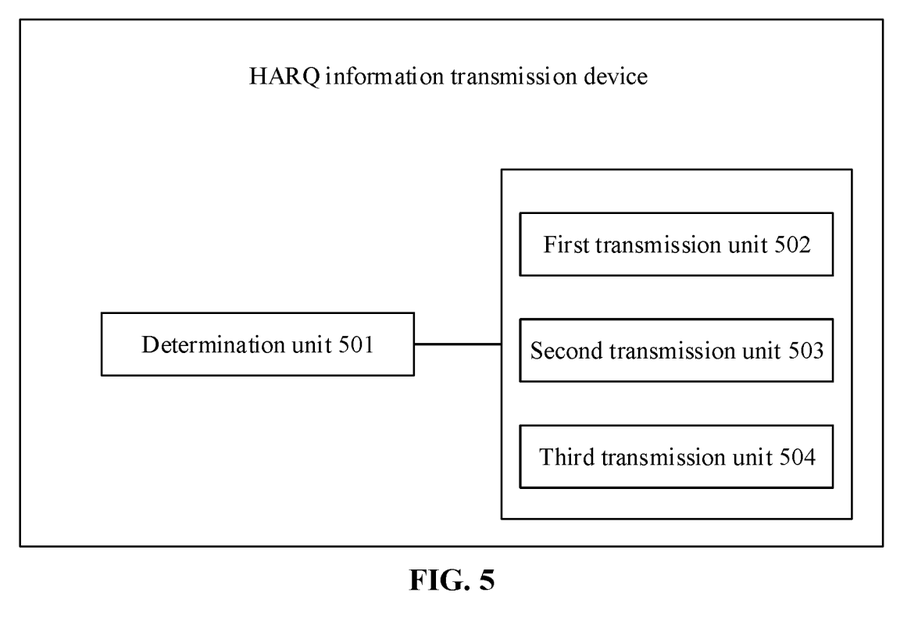
FIG. 5 is a first structure diagram of a device for transmitting HARQ information according to an embodiment of the disclosure.

FIG. 5 is a first structure diagram of a device for transmitting HARQ information according to an embodiment of the disclosure. As shown in FIG. 5, the device for transmitting HARQ information in the embodiment of the disclosure includes a determination unit 501 and a first transmission unit 502.

The determination unit 501 is configured to determine a first uplink time unit, the first uplink time unit is used for a terminal device to transmit first uplink control information, the first uplink control information includes first HARQ information, the first HARQ information includes at least one piece of HARQ information corresponding to a first downlink shared channel received by the terminal device, and the first downlink shared channel includes at least one downlink shared channel.

The first transmission unit 502 is configured to transmit the first uplink control information in the first uplink time unit.

Optionally, the first downlink shared channel is transmitted through at least one downlink time unit in a first time duration.

In an implementation mode, a last downlink time unit in the first time duration is a first downlink time unit, and a time interval between the first downlink time unit and the first uplink time unit is more than or equal to a first value.

In an implementation mode, the first value is specified by a communication system; or, the first value is indicated by a network device through physical-layer signaling; or, the first value is configured by the network device through higher-layer signaling.

In an implementation mode, a starting downlink time unit in the first time duration is a second downlink time unit, and a time interval between the second downlink time unit and the first uplink time unit is less than or equal to a second value.

In an implementation mode, the second value is specified by the communication system; or, the second value is indicated by the network device through the physical-layer signaling; or, the second value is configured by the network device through the higher-layer signaling.

In an implementation mode, the device further includes a second transmission unit 503.

The second transmission unit 503 is configured to transmit the first uplink control information in a second uplink time unit, the second uplink time unit being later than the first uplink time unit.

In an implementation mode, the determination unit 501 is further configured to determine a third uplink time unit, the third uplink time unit is used for the terminal device to transmit second uplink control information, the second uplink control information includes second HARQ information, the second HARQ information includes at least one piece of HARQ information corresponding to a second downlink shared channel received by the terminal device, the second downlink shared channel includes at least one downlink shared channel, and the second downlink shared channel is transmitted on at least one downlink time unit in a second time duration.

The device further includes a third transmission unit 504, configured to transmit the second uplink control information in the third uplink time unit.

In an implementation mode, the second time duration is later than the first time duration, and there is no downlink time unit between the first time duration and the second time duration.

In an implementation mode, the second time duration is later than the first time duration, and each of the first time duration and the second time duration includes the same third downlink time unit, the third downlink time unit includes at least one downlink time unit.

In an implementation mode, the first uplink control information further includes third HARQ information, and/or, the second uplink control information further includes the third HARQ information, the third HARQ information includes at least one piece of HARQ information corresponding to at least one downlink shared channel transmitted in the third downlink time unit.

Those skilled in the art should know that functions realized by each unit in the device for transmitting HARQ information shown in FIG. 5 may be understood with reference to related descriptions about the method for transmitting HARQ information. The functions of each unit in the device for transmitting HARQ information shown in FIG. 5 may be realized through a program running in a processor, and may also be realized through a specific logical circuit. It is also to be understood that the first transmission unit 502, second transmission unit 503 and third transmission unit 504 shown in FIG. 5 may be the same transmission unit and may also be different transmission units and there are no limits made in the disclosure.

Figure 6:
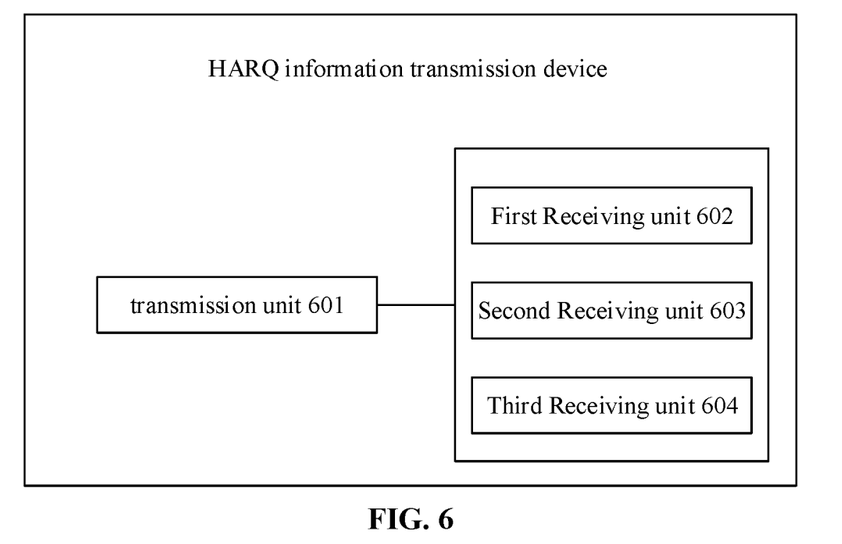
FIG. 6 is a second structure diagram of a device for transmitting HARQ information according to an embodiment of the disclosure.

FIG. 6 is a second structure diagram of a device for transmitting HARQ information according to an embodiment of the disclosure. As shown in FIG. 6, the device for transmitting HARQ information in the embodiment of the disclosure includes a transmission unit 601 and a first receiving unit 602.

The transmission unit 601 is configured to transmit first information to a terminal device, the first information indicates a first uplink time unit used for the terminal device to transmit first uplink control information, the first uplink control information includes first HARQ information, the first HARQ information includes at least one piece of HARQ information corresponding to a first downlink shared channel received by the terminal device, and the first downlink shared channel includes at least one downlink shared channel.

The first receiving unit 602 is configured to receive the first uplink control information in the first uplink time unit.

Optionally, the first downlink shared channel is transmitted through at least one downlink time unit in a first time duration.

In an implementation mode, a last downlink time unit in the first time duration is a first downlink time unit, and a time interval between the first downlink time unit and the first uplink time unit is more than or equal to a first value.

In an implementation mode, the first value is specified by a communication system; or, the first value is indicated by a network device through physical-layer signaling; or, the first value is configured by the network device through higher-layer signaling.

In an implementation mode, a starting downlink time unit in the first time duration is a second downlink time unit, and a time interval between the second downlink time unit and the first uplink time unit is less than or equal to a second value.

In an implementation mode, the second value is specified by the communication system; or, the second value is indicated by the network device through the physical-layer signaling; or, the second value is configured by the network device through the higher-layer signaling.

In an implementation mode, the device further includes a second receiving unit 603.

The second receiving unit 603 is configured to receive the first uplink control information in a second uplink time unit, the second uplink time unit is later than the first uplink time unit.

In an implementation mode, the transmission unit 601 is further configured to transmit second information to the terminal device, the second information indicates a third uplink time unit used for the terminal device to transmit second uplink control information, the second uplink control information includes second HARQ information, the second HARQ information includes at least one piece of HARQ information corresponding to a second downlink shared channel received by the terminal device, the second downlink shared channel includes at least one downlink shared channel, and the second downlink shared channel is transmitted in at least one downlink time unit in a second time duration.

The device further includes a third receiving unit 604.

The third receiving unit 604 is configured to receive the second uplink control information in the third uplink time unit.

In an implementation mode, the second time duration is later than the first time duration, and there is no downlink time unit between the first time duration and the second time duration.

In an implementation mode, the second time duration is later than the first time duration, and each of the first time duration and the second time duration includes the same third downlink time unit, the third downlink time unit includes at least one downlink time unit.

In an implementation mode, the first uplink control information further includes third HARQ information, and/or, the second uplink control information further includes the third HARQ information, the third HARQ information includes at least one piece of HARQ information corresponding to at least one downlink shared channel transmitted in the third downlink time unit.

Those skilled in the art should know that functions realized by each unit in the device for transmitting HARQ information shown in FIG. 6 may be understood with reference to related descriptions about the method for transmitting HARQ information. The functions of each unit in the device for transmitting HARQ information shown in FIG. 6 may be realized through a program running in a processor, and may also be realized through a specific logical circuit. It is also to be understood that the first receiving unit 602, second receiving unit 603 and third receiving unit 604 shown in FIG. 6 may be the same receiving unit and may also be different receiving units and there are no limits made in the disclosure.

When being implemented in form of software functional module and sold or used as an independent product, the device for transmitting HARQ information of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer-executable instruction is stored, the computer-executable instruction is executed by a processor to implement the method for transmitting HARQ information of the embodiments of the disclosure.

Figure 7:
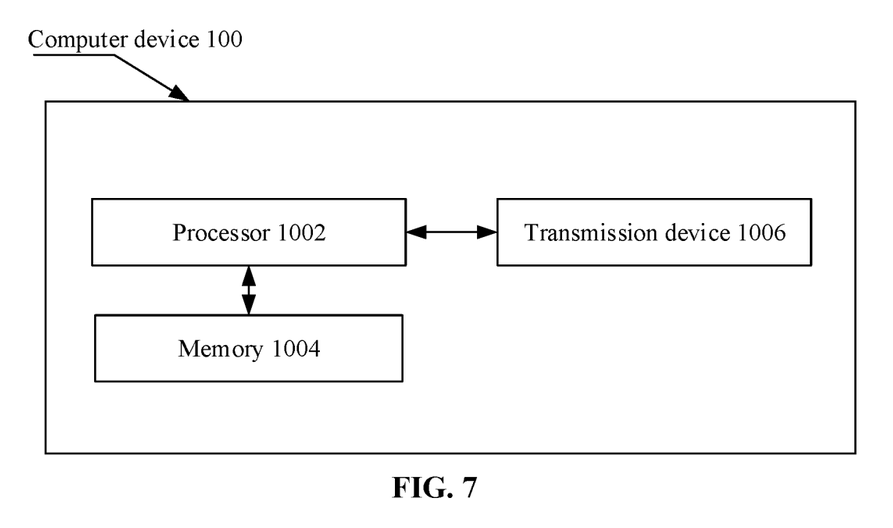
FIG. 7 is a structure diagram of a computer device according to an embodiment of the disclosure.

FIG. 7 is a structure diagram of a computer device according to an embodiment of the disclosure. The computer device may be a terminal device and may also be a network device. As shown in FIG. 7, the computer device 100 may include one or more (only one is illustrated in the figure) processors 1002 (the processor 1002 may include, but not limited to, a processing device such as a Micro Control Unit (MCU) or a Field Programmable Gate Array (FPGA)), a memory 1004 configured to store data and a transmission device 1006 configured for a communication function. Those of ordinary skill in the art should know that the structure shown in FIG. 7 is only schematic and not intended to limit the structure of the electronic device. For example, the computer device 100 may further include components more or fewer than the components shown in FIG. 7 or has a configuration different from that shown in FIG. 7.

The memory 1004 may be configured to store a software program of application software and a module, for example, a program instruction/module corresponding to a method in the embodiments of the disclosure. The processor 1002 runs the software program and module stored in the memory 1004, thereby executing various functional applications and data processing, namely implementing the abovementioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or transmit data through a network. A specific example of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner.

In the technical solutions of the embodiments of the disclosure, the terminal device determines the first uplink time unit, the first uplink time unit is used for the terminal device to transmit the first uplink control information, the first uplink control information includes the first HARQ information, the first HARQ information is the at least one piece of HARQ information corresponding to the first downlink shared channel received by the terminal device, the first downlink shared channel includes the at least one downlink shared channel and the first downlink shared channel being transmitted in the at least one downlink time unit in the first time duration; and the terminal device transmits the first uplink control information in the first uplink time unit. With adoption of the technical solutions of the embodiments of the disclosure, when uplink control information is fed back in an unlicensed carrier, one or more downlink time units corresponding to a PUCCH are determined based on a time unit where the PUCCH is located, thereby feeding back HARQ information corresponding to a PDSCH transmitted in the one or more downlink time units in the PUCCH. By such a flexible HARQ feedback method, the network device may flexibly and effectively allocate uplink and downlink resources in an unlicensed spectrum under the condition of ensuring a delay and performance of the whole communication link.

The technical solutions recorded in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for transmitting Hybrid Automatic Repeat reQuest (HARQ) information, comprising:
    determining, by a terminal device, a first uplink slot, the first uplink slot being used for the terminal device to transmit first uplink control information, the first uplink control information comprising first HARQ information, the first HARQ information comprising at least two pieces of HARQ information corresponding to a first downlink shared channel received by the terminal device, the first downlink shared channel comprising at least two downlink shared channels, and the first downlink shared channel being transmitted through at least two downlink slots in a first time duration,
    wherein a last downlink slot in the first time duration is a first downlink slot, a time interval between the first downlink slot and the first uplink slot is more than or equal to a first value, the first value is indicated by the network device through physical-layer signaling, and a unit of the first value is slot; and
    wherein a starting downlink slot in the first time duration is a second downlink slot, and a time interval between the second downlink slot and the first uplink slot is less than or equal to a second value, the second value is indicated by the network device through physical-layer signaling; or, the second value is configured by the network device through higher-layer signaling; and
    transmitting, by the terminal device, the first uplink control information in the first uplink slot.

2. The method of claim 1, further comprising:
    transmitting, by the terminal device, the first uplink control information in a second uplink slot, the second uplink slot being later than the first uplink slot.

3. The method of claim 1, further comprising:
    determining, by the terminal device, a third uplink slot, the third uplink slot being used for the terminal device to transmit second uplink control information, the second uplink control information comprising second HARQ information, the second HARQ information comprising at least one piece of HARQ information corresponding to a second downlink shared channel received by the terminal device, the second downlink shared channel comprising at least one downlink shared channel and the second downlink shared channel being transmitted in at least one downlink slot in a second time duration; and
    transmitting, by the terminal device, the second uplink control information in the third uplink slot.

4. The method of claim 3, wherein the second uplink slot is determined by the terminal device according to a second indication transmitted by the network device.

5. The method of claim 1, wherein the first uplink slot is determined by the terminal device according to a first indication transmitted by a network device.

6. A device for transmitting Hybrid Automatic Repeat reQuest (HARQ) information, comprising:
    a processor;
    a memory for storing instructions executable by the processor; and
    an input/output interface,
    wherein the processor is configured to execute the instructions to perform the following operations:
        determining a first uplink slot, the first uplink slot is used to transmit first uplink control information, the first uplink control information comprises first HARQ information, the first HARQ information comprises at least two pieces of HARQ information corresponding to a first downlink shared channel, the first downlink shared channel comprises at least two downlink shared channels, and the first downlink shared channel is transmitted through at least two downlink slots in a first time duration, wherein a last downlink slot in the first time duration is a first downlink slot, a time interval between the first downlink slot and the first uplink slot is more than or equal to a first value, the first value is indicated by the network device through physical-layer signaling, and a unit of the first value is slot; and wherein a starting downlink slot in the first time duration is a second downlink slot, and a time interval between the second downlink slot and the first uplink slot is less than or equal to a second value, the second value is indicated by the network device through physical-layer signaling; or, the second value is configured by the network device through higher-layer signaling; and
        transmitting the first uplink control information in the first uplink slot via the input/output interface.

7. The device of claim 6, wherein the processor is further configured to execute the instructions to transmit the first uplink control information in a second uplink slot, the second uplink slot is later than the first uplink slot.

8. The device of claim 6, wherein the processor is further configured to execute the instructions to determine a third uplink slot, the third uplink slot is used to transmit second uplink control information, the second uplink control information comprises second HARQ information, the second HARQ information comprises at least one piece of HARQ information corresponding to a second downlink shared channel, the second downlink shared channel comprises at least one downlink shared channel, and the second downlink shared channel is transmitted in at least one downlink slot in a second time duration; and
    transmit the second uplink control information in the third uplink slot via the input/output interface.

9. The device of claim 8, wherein the second time duration is later than the first time duration, and no downlink slot exists between the first time duration and the second time duration.

10. The device of claim 9, wherein the second uplink slot is determined by the terminal device according to a second indication transmitted by the network device.

11. The device of claim 6, wherein the first uplink slot is determined by the terminal device according to a first indication transmitted by a network device.

12. A non-transitory computer storage medium having computer-executable instructions stored thereon, the computer-executable instruction being executed by a processor to implement the following operations:

determining a first uplink slot, the first uplink slot is used to transmit first uplink control information, the first uplink control information comprises first HARQ information, the first HARQ information comprises at least two pieces of HARQ information corresponding to a first downlink shared channel, the first downlink shared channel comprises at least two downlink shared channels, and the first downlink shared channel is transmitted through at least two downlink slots in a first time duration, wherein a last downlink slot in the first time duration is a first downlink slot, a time interval between the first downlink slot and the first uplink slot is more than or equal to a first value, the first value is indicated by the network device through physical-layer signaling, and the unit of the first value is slot; and wherein a starting downlink slot in the first time duration is a second downlink slot, and a time interval between the second downlink slot and the first uplink slot is less than or equal to a second value, the second value is indicated by the network device through physical-layer signaling; or, the second value is configured by the network device through higher-layer signaling; and transmitting the first uplink control information in the first uplink slot.

\* \* \* \* \*